United States Patent [19]

Brühl

[11] Patent Number: 5,249,817
[45] Date of Patent: Oct. 5, 1993

[54] MOTOR VEHICLE FRONT STEERABLE AXIS WITH TORSION BAR STABILIZER

[75] Inventor: Hubert Brühl, Waldstetten, Fed. Rep. of Germany

[73] Assignee: Mercedes-Benz AG, Fed. Rep. of Germany

[21] Appl. No.: 955,240

[22] Filed: Oct. 1, 1992

Related U.S. Application Data

[63] Continuation of Ser. No. 696,707, May 7, 1991, abandoned.

[30] Foreign Application Priority Data

May 29, 1990 [DE] Fed. Rep. of Germany ....... 4017210

[51] Int. Cl.$^5$ .............................................. B62D 1/00
[52] U.S. Cl. ...................................... 280/94; 280/673; 280/691
[58] Field of Search ............... 280/660, 670, 689, 691, 280/666, 645, 700, 692, 723, 673, 675, 96.1, 94; 267/183, 188

[56] References Cited

U.S. PATENT DOCUMENTS

| | | | |
|---|---|---|---|
| 2,871,025 | 1/1959 | Neher | 280/666 |
| 2,961,253 | 11/1960 | Allison . | |
| 4,153,272 | 5/1979 | Fiedler et al. | 280/689 |
| 4,334,691 | 6/1982 | Scheib | 280/14.1 |
| 4,875,703 | 10/1989 | Murakami | 280/689 |
| 4,923,209 | 5/1990 | Armbrust et al. | 280/689 |

FOREIGN PATENT DOCUMENTS

| | | |
|---|---|---|
| 3027694 | 2/1982 | Fed. Rep. of Germany . |
| 3803802 | 6/1982 | Fed. Rep. of Germany . |
| 533159 | 2/1941 | United Kingdom . |
| 8201688 | 5/1982 | United Kingdom . |

Primary Examiner—Margaret A. Focarino
Assistant Examiner—Paul Dickson
Attorney, Agent, or Firm—Evenson, McKeown, Edwards & Lenahan

[57] ABSTRACT

A front axle of a motor vehicle has steerable wheels and is equipped with a torsion-bar stabilizer to improve the returnability of the steering without a large amount of additional technical expenditure. Connecting arms connect the wheel carriers to the offset ends of the torsion-bar stabilizer with the joint of the connecting arms which is on the wheel-carrier side articulated in the respective steering axis on the wheel carrier. During movement of the wheel carriers about the steering axis, the connecting arms can be swivelled via the wheel carriers, in the same direction as the wheel carriers and counter to a flexible restoring support situated in the connection of the torsion-bar stabilizer to the respective connecting arm. The restoring support between connecting arms and torsion-bar end pieces provided by a rubber torsion bearing produces a restoring torque which is proportional to the steering angle and improves the returnability of the steering.

3 Claims, 2 Drawing Sheets

MOTOR VEHICLE FRONT STEERABLE AXIS WITH TORSION BAR STABILIZER

This is a continuation of application Ser. No. 07/696,707 filed May 7, 1991, now abandoned.

BACKGROUND AND SUMMARY OF THE INVENTION

The present invention relates to a steerable motor more particularly, to a steerable axle with a torsion bar stabilizer held at the superstructure side and having offset pieces secured to the lower end of a connecting arm which has an upper end articulated in the wheel steering axis.

A front axle is shown in German Patent No. 3,803,802. Connecting arms connecting the stabilizer-side joints of a torsion-bar stabilizer and wheel carrier are formed by swivel joints, and their joints on the wheel-carrier side are configured as ball-and-socket joints. This arrangement ensured that forces transmitted by the torsion bar of the torsion-bar stabilizer to the wheel carriers to reduce the side tilt of the vehicle superstructure during cornering have no influence on the steering.

It is an underlying object of the invention to provide a front axle configuration having a stabilizer arrangement which fulfills the additional purpose of improving the returnability of the steering.

This object has been achieved according to the present invention by swivelling the connecting arm about the steering axis via the wheel carrier and in the same direction as the wheel carrier, counter to a flexible restoring support situated in the connection of the torsion bar stabilizer to the connecting arm. The torsion-bar stabilizer thus contributes to the improvement of the returnability of the steering in that, during steering movements of the wheel carriers, a restoring torque proportional to the steering angle is produced via the connecting arms of the torsion-bar stabilizer by the flexible and restoring supports provided in the connections of the torsion-bar stabilizer to the connecting arms articulated on the wheel carriers. This restoring torque considerably improves the returnability of the steering, particularly in the case of maximum steering lock.

The movement of the connecting arm in the same direction as the wheel carrier can be accomplished by a swivel joint connecting these two parts to each other.

A presently preferred embodiment of the invention provides a construction in which the restoring torque is produced within the stabilizer-side joint of the connecting arm. An axially loadable rubber torsion bearing is particularly suitable for this purpose.

In a further advantageous embodiment of the invention, it is proposed that the upper joint connecting the connecting arm to the wheel carrier also be provided in the form of an axially loadable rubber torsion bearing. This offers the special advantage that, during steering movements, the connecting arm is not taken along by the wheel carrier in a positive fashion. The connecting arm is also taken along over part of the steering angle, as a function of the torsional rigidity of the rubber torsion bearing.

Insofar as the two rubber torsion bearings are of identical configuration and corresponding dimensions in this arrangement, the resulting swivel angle for the connecting arm is approximately half as great as the steering angle. As a result, the problems with freedom of motion are reduced, especially when, in accordance with another advantageous embodiment of the invention, the connecting arm is of U-, arc- or crescent-shaped design. This makes it possible to have the arm reach laterally around the wheel carrier and thereby move it a relatively long way into the wheel in order to achieve as favorable as possible a stabilizer ratio. In this case, it is furthermore possible to create, for example, a semicircular free space for a wheel drive shaft.

BRIEF DESCRIPTION OF THE DRAWINGS

These and other objects, features and advantages of the present invention will become more apparent from the following detailed description of presently preferred embodiments when taken in conjunction with the accompanying drawings wherein.

DETAILED DESCRIPTION OF THE DRAWINGS

Figure 1:
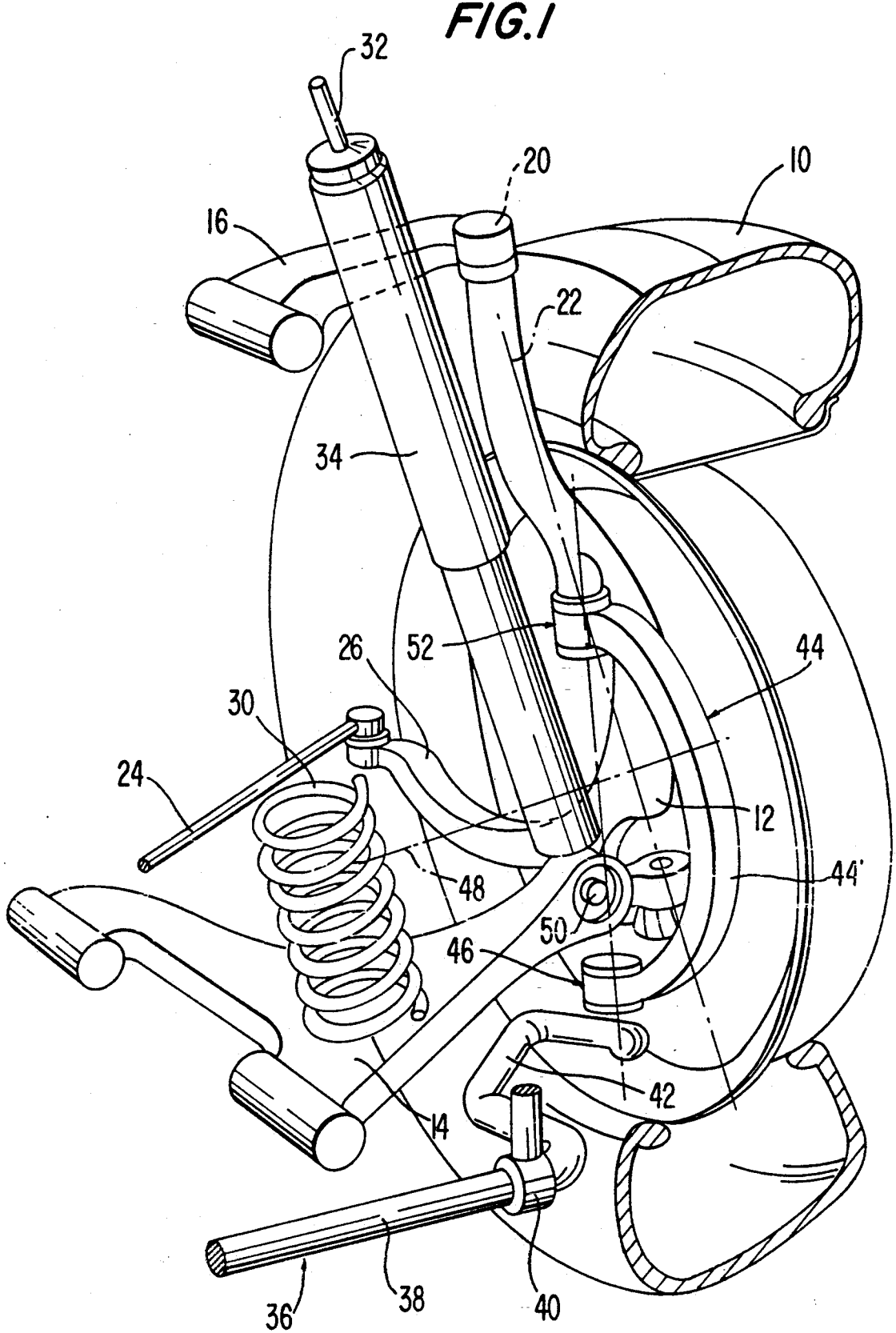
FIG. 1 is a perspective view of an independent wheel suspension of a steerable front axle, looking at the inner side of the wheel.

A wheel 10 of a wheel suspension is mounted on a wheel carrier 12 which is guided, for example, by two radius arms 14 and 16, such as, for example, transverse links, mounted in a known way on the vehicle superstructure (not shown). For this purpose, the lower transverse link 14 carriers a supporting joint 18 (FIG. 2), while the upper transverse link 16 is connected to the wheel carrier 12 via a guiding joint 20. The two joints 18, 20 form ball and socket joints which define a steering axis 22 about which the wheel carrier 12 can be rotated during steering movements. Only one track rod 24 of the steering apparatus is shown, and is articulated on a track rod arm 26 of the wheel carrier 12.

Figure 2:
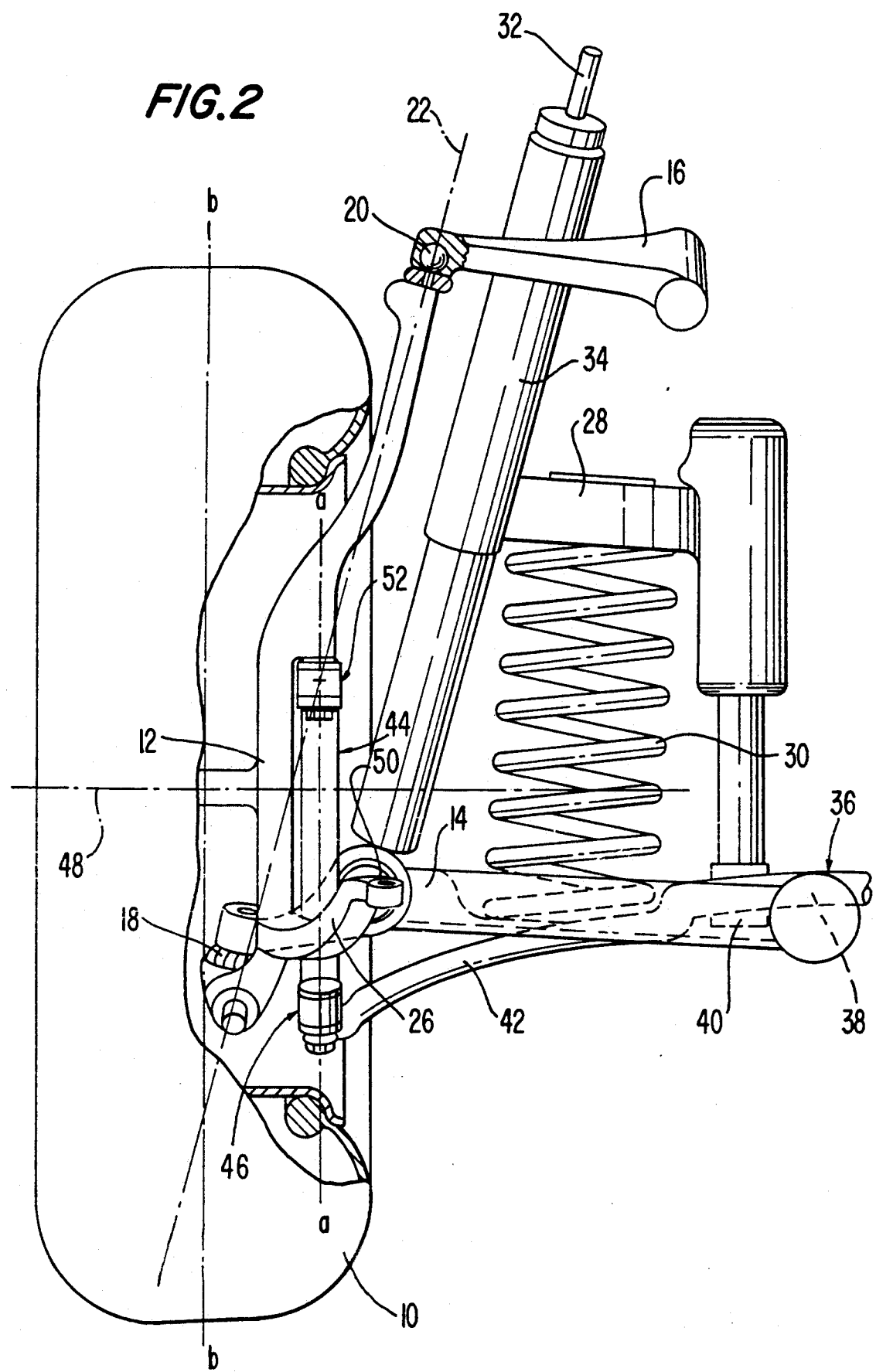
FIG. 2 is a rear view of the wheel suspension of FIG. 1.

A helical spring 30 is supported on the lower transverse link 14 and is held by its upper end in a spring dome 28 fixed to the superstructure (FIG. 2). A shock absorber 34 movably supported by its piston rod 32 against an upper support bearing (not shown) on the superstructure side is furthermore articulated on the wheel-side end of the lower transverse link 14. A torsion-bar stabilizer designated generally by the numeral 36 has a torsion bar 38 rotatably mounted on bearings 40 fixed to the superstructure.

The end pieces 42 of the torsion bar 38 are offset and are each articulated on a preferably arc-shaped connecting arm 44, via which the torsion-bar stabilizer 36 is supported on each of the wheel carriers 12. A joint 46 is provided for this purpose and is situated below the axis of rotation 48 of the wheel or below the bearing 50 of the shock absorber 34, which bearing 50 is on the transverse link side.

A further joint 52 completes the articulation of the connecting arm 44 on the wheel carrier 12. This joint 52 is provided above the axis of rotation 48 of the wheel and lies in the steering axis 22 of the wheel carrier 12. The lower joint 46 is formed by a conventional rubber torsion bearing which can be loaded axially in the vertical direction. The upper joint 52 is also preferably a rubber torsion bearing. The inner and outer bearing bushes of each bearing are held torsionally rigid on the wheel carrier 12 and end piece 42 of the torsion-bar stabilizer 36, respectively, and held in a corresponding end of the connecting arm 44.

In the straight-ahead position of the wheel shown in FIG. 2, the arc-shaped connecting arm 44 is preferably fitted into the wheel suspension, preferably in the longitudinal direction of the vehicle. The two rubber torsion bearings 46, 52 are aligned coaxially to one another in a vertical plane a-a. This arrangement offers the advantage that reaction forces in the torsion-bar linkage have no effect on the steering since tensile and compressive forces have the same line of action intersecting the steering axis 22.

The upper joint 52 can also be an elastic swivel joint fixed on the wheel carrier 12, with the axis extending in the transverse direction of the vehicle. In this embodiment, the angle of rotation of the connecting arm 44 upon rotation of the wheel carrier 12 would correspond essentially to the steering angle. The resulting torsional stress on the lower joint 46 results in a desired restoring torque of the steering.

The configuration of the two joints 46, 52 as rubber torsion bearings offers the following advantages. During steering movements, the rotary motion of the wheel carrier 12 is taken up by both rubber torsion bearings 46, 52 and an angle of rotation of the connecting arm 44 which is dependent on their torsional rigidity is established. The two rubber torsion bearings 46, 52 are preferably of identical configuration which is such that the resulting angle of rotation of the connecting arm 44 corresponds essentially to only half the steering angle. As a result, the space requirement for the connecting arm 44 is reduced, particularly in the case of full wheel lock, which is of considerable significance where space is limited.

It is only possible to obtain a steering angle of over 42° at all by the use of two rubber torsion bearings 46, 52 without subjecting them to impermissibly severe shear stress. The arc-shaped connecting arm 44 makes it possible to place the latter within the wheel 10, as close as possible to the plane of contact b-b of the wheel (FIG. 2), to achieve a favorable transmission ratio for the torsion-bar stabilizer 36. The yoke 44' of the connecting arm 44 can be arranged in front of or behind the axis of rotation 46 of the wheel, as viewed in the driving direction.

At least one (but preferably, however, both) of the rubber torsion bearings 46, 52 have a certain pivoting ability, allowing distortions to be accommodated without inhibiting constraint. In order to keep the distortions small, it has been found expedient if the rubber bearing 46 is also situated in the vicinity of the steering axis 22.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A steerable motor-vehicle front axle, comprising a wheel carrier guided by upper and lower transverse links, a torsion-bar stabilizer with a torsion bar operatively arranged at a vehicle superstructure side and having an offset piece at each end, a connecting arm operatively connected with each wheel of the front axle between the stabilizer and the wheel carrier and having a lower end to which is secured, via means for providing an articulated torsional rubber bearing connection, an associated one of the offset pieces such that a steering restoring torque changes proportionally to a change in steering angle, and an upper end of the connecting arm operatively connected with the wheel carrier and with means for providing an articulated torsional rubber bearing connection in the steering axis of the associated wheel on the wheel carrier, wherein the connecting arm is arranged to be swivelled about the steering axis via the wheel carrier, in the same direction as the wheel carrier, counter to a flexible restoring support situated in the connection of the torsion-bar stabilizer to the connecting arm.

2. The axle according to claim 1, wherein the connecting arm is arc-shaped.

3. The axle according to claim 1, wherein the articulation of the connecting arm on the wheel carrier is swivellable.

* * * * *